Sept. 8, 1936.    G. L. HISE    2,053,829
FLASH SCRAPER
Filed March 31, 1936
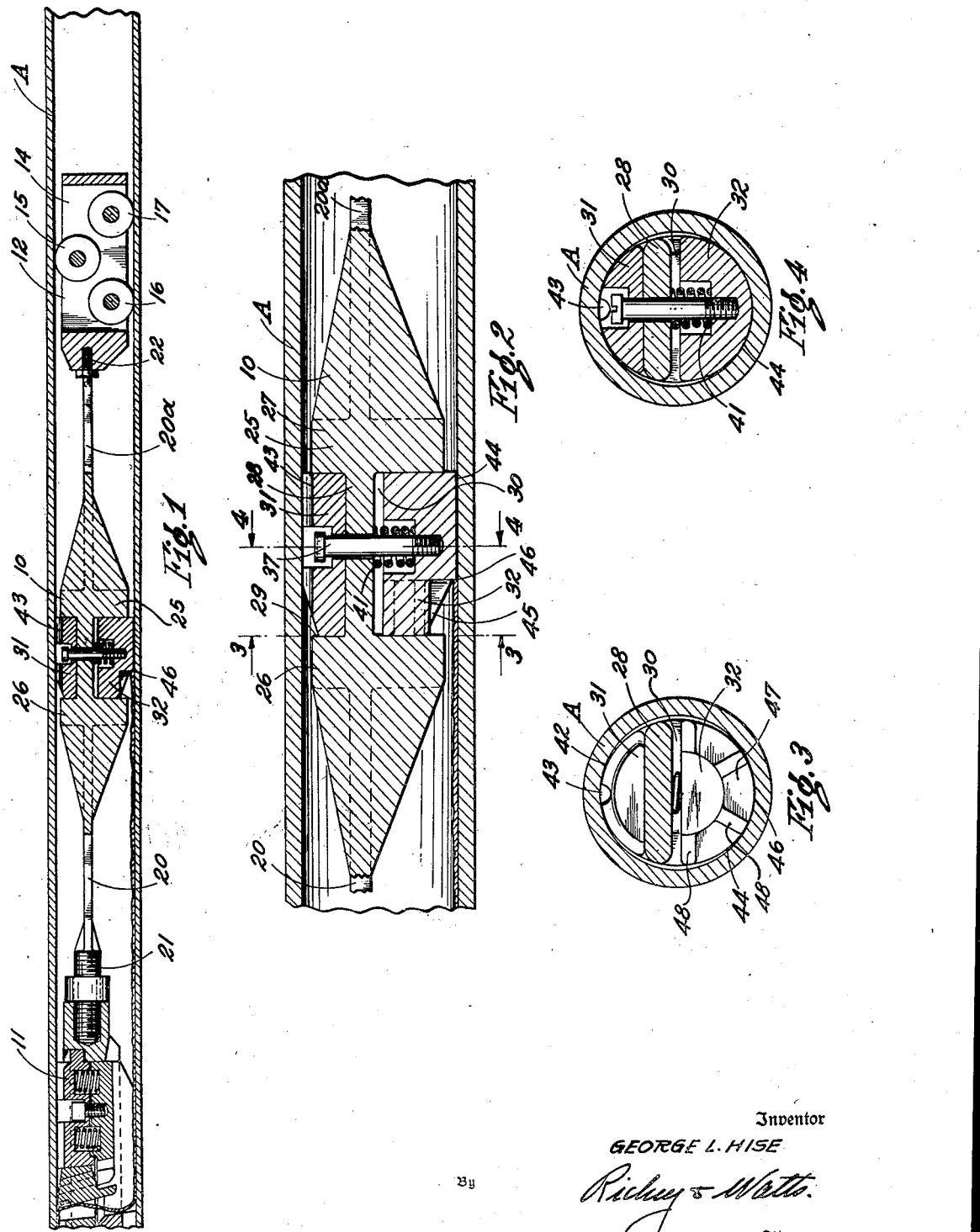
Inventor
GEORGE L. HISE
By Richey & Watts
Attorneys Patented Sept. 8, 1936

2,053,829

UNITED STATES PATENT OFFICE 2,053,829

FLASH SCRAPER

George L. Hise, Conneaut Lake, Pa., assignor to Republic Steel Corporation, Cleveland, Ohio, a corporation of New Jersey Application March 31, 1936, Serial No. 71,972

8 Claims. (Cl. 29—33)

This invention relates broadly to the manufacture of butt welded pipe or tubing and is particularly concerned with a device for collecting metal which has been removed from the interior of a pipe or tube, especially pipe of the electric resistance butt welded type.

Heretofore, it has been the practice in manufacturing electric resistance butt welded pipe to remove the flash metal from the seam by any suitable device and immediately thereafter to roll down or planish the seam to provide a smooth surface on the interior of the pipe in the vicinity of and across the weld. Such flash metal which was often deposited on the inside wall of the pipe was not removed therefrom until the length of pipe had passed beyond the burr removing device. This practice presented certain objectionable features from the standpoint of rolling or planishing the seam metal following the removal of the burr. For example, the severed flash and any chips or spittings on the inside of the pipe could come into contact with the rolls of the planishing unit and when this occurred there was a tendency for portions of the same to be rolled into the wall of the pipe or for parts of the planishing unit to be worn unduly. Where the planishing rolls were subjected to considerable wear the effectiveness of the planishing unit decreased with continued use.

By the present invention I have provided a device which overcomes the foregoing objections and which serves to collect the severed flash and any extraneous matter such as chips, spittings and the like and prevent them from contacting with the rolls of the planishing unit. By the use of my device the planishing unit is not subjected to any undue wear and its efficiency is maintained for a greater length of time. Furthermore, the pipe so produced is free from any foreign particles embedded in the surface thereof by the planishing rolls.

The foregoing and other advantages of my invention and the invention itself will become more apparent from the following detailed description of a preferred embodiment thereof taken in conjunction with the accompanying drawing illustrating one form of my invention, wherein:—

Fig. 1 is a longitudinal sectional view of my improved device disposed within a length of pipe and shown in cooperation with a burr removing device and a planishing unit;

Fig. 2 is an enlarged sectional view of the flash collector disposed within a length of pipe;

Fig. 3 is a sectional view taken on the line 3—3 of Fig. 2;

Fig. 4 is a sectional view taken on the line 4—4 of Fig. 2;

Throughout the drawing and specification like parts have been designated by like reference characters.

In Fig. 1 of the drawing there is illustrated one embodiment of my invention indicated broadly by the numeral 10 employed in conjunction with a burr remover 11 and a planishing unit 12 of an electric pipe welding machine (not shown). The devices 10, 11 and 12 as shown are operatively disposed within a pipe A. Any suitable burr removing or severing means may be used, for example, device 11 which severs the burr and directs it onto the opposite inner surface of the pipe. The device 11 shown in Fig. 1 of the drawing is more fully illustrated and is described in detail and claimed in the copending application of David E. Jenkins, Serial No. 72,975 filed April 6, 1936. The planishing unit 12 may, likewise, be of any design, suitable for the purpose of rolling down or planishing the welded seam of a pipe following the removal of the burr or flash metal therefrom. As illustrated in Fig. 1 of the drawing this device consists of a housing 14 carrying a top planishing roll 15 and a pair of supporting rolls 16 and 17. The top planishing roll 15 engages the welded seam of the pipe A and is maintained in operative relation thereto by the rolls 16 and 17. The planishing unit is of a rigid construction and when set up the planishing roll 15 may also serve to reduce the radial thickness of the seam. It will be readily apparent, that any undue wear on the rolls 15, 16 and 17 will correspondingly reduce the effectiveness of the planishing roll 15 by reason of a reduction in the pressure applied by the rolls to the pipe. Since flash, chips and spittings and the like tend to wear the rolls or their mountings, it is desirable to preclude engagement of any such extraneous material with the rolls of the planishing unit, and such is a purpose of the collector 10.

The device 10 is shown positioned within the tube A between the burr remover 11 and the planishing unit 12 and comprises a frame 25 connected by means of plates 20 and 20a and threaded connections 21 and 22 with the burr remover 11 and planishng unit 12, respectively. The frame 25 includes end members 26 and 27 and cross member 28 which define upper and lower recesses or guideways 29 and 30. Slidably mounted within the respective recesses 29 and 30 are pipe engaging members 31 and 32 which are secured together for limited movement relative to each other and to the frame 25 by means of a cap screw 37. Disposed on the shank of the cap screw 37 between the cross member 28 and the pipe engaging member 32 is a spring 41 which normally presses the pipe engaging member 32 against the lower part of the inside surface of the pipe.

The shoe 31 is provided with a curved pipe engaging surface 42 which is interrupted by the longitudinal groove 43 which straddles the seam from which the burr had been removed by the burr remover 11. The main purpose of shoe 31 is to prevent whipping of the frame 25 and to take the wear caused by the upper surface of the pipe. The shoe 32 is provided with pipe engaging surface 44 which is normally maintained in engagement with the inside wall of the pipe by means of spring 41. The shoe 32 is cut away as at 45 to provide a scraping edge 46 adjacent the surface 44. This cut away portion provides a chamber 47 in which the severed burr metal may collect and be retained as it is scraped from the inside wall of the pipe by the scraping edge 46. The spring 41 acts on the lower shoe 32 causing the scraping edge to move suddenly to dislodge metal pieces collected in the chamber 47 when the end of a pipe passes beyond the device. A plurality of inclined ribs 48 extending across the chamber 47 serve to guide the scraper into the entering end of a succeeding length of pipe.

It will be noted that there is considerable free space within the pipe between the burr cutter 11 and scraper 10 so that flash and other metal particles may be dammed up in such space by member 32 until the end of the pipe has passed beyond the scraper.

Having thus described my invention, I am aware that numerous and extensive departures may be made therefrom without departing from the spirit and scope of the appended claims.

I claim:

1. In a device of the class described the combination of a flash remover for severing hot, plastic flash metal from the inside wall of a length of pipe and directing same onto the inside surface of the pipe, a planishing unit including rolls for planishing the still highly heated surface of the pipe and means slidably engaging that portion of the inner surface of the pipe on which the severed flash metal rests and disposed between the flash remover and planishing unit for collecting and retaining the severed flash metal.

2. In a device of the class described the combination of a flash remover for severing hot plastic flash metal from a longitudinally extending welded seam of a pipe and directing same onto the inside surface of the pipe, a planishing unit including rolls for planishing the still highly heated surfaces of the pipe from which flash metal has been severed, and means lying close to the major portion of the inner surface of the pipe disposed between the flash remover and planishing unit for collecting and retaining the severed flash metal.

3. In a device of the class described the combination of a flash remover for severing hot plastic flash metal from the inside wall of a pipe, a planishing unit including planishing rolls for planishing the still highly heated surfaces of the pipe from which flash metal has been severed and means disposed between the flash remover and planishing unit for collecting and retaining the severed flash metal, said means including a frame, and a pipe engaging member slidably mounted in said frame and engaging the lower portion of the inside surface of the pipe.

4. In a device of the class described the combination of a flash remover for severing hot plastic flash metal from the inside wall of a pipe, a planishing unit including planishing rolls for planishing the still highly heated surfaces of the pipe from which flash metal has been severed and means disposed between the flash remover and planishing unit for collecting and retaining the severed flash metal, said means including a frame, a pipe engaging member slidably mounted in said frame and resilient means for pressing said member against the lower part of the inside surface of the pipe.

5. A device of the class described comprising a frame, pipe engaging members slidably mounted in said frame for slidably engaging opposite portions of the inside surface of a pipe, a scraping edge formed on one end of the lower of said members and resilient means for pressing said last named member into engagement with the lower inner surface of a pipe to collect severed flash metal lying thereon.

6. A device of the class described comprising a frame, pipe engaging members slidably mounted in said frame for engaging opposite portions of the inside surface of a pipe, a scraping edge formed on one of said members, said frame and last named member defining a recess for retaining material collected by said scraping edge and resilient means operable on the scraping edge carrying member to move the same suddenly to dislodge metal pieces in the recess when the end of a pipe passes beyond the device.

7. A device of the class described comprising a frame, opposed members slidably mounted in said frame, and slidably engaging diametrically opposite inner surfaces of the pipe, means securing said members together for limited movement relative to said frame, a scraping edge formed on one end of the lower of said members and resilient means maintaining said scraping edge in engagement with the lower inner surface of a pipe to collect loose material in the pipe.

8. In a device of the class described the combination of a flash remover for severing hot plastic flash metal from the inside wall of a pipe, a planishing unit including planishing rolls for planishing the still highly heated surfaces of the pipe from which flash metal has been severed and means disposed between the flash remover and planishing unit for collecting and retaining the severed flash metal, said means including a frame, and a pair of pipe engaging members slidably mounted in said frame and engaging the upper and lower portions respectively of the inside surface of the pipe.

GEORGE L. HISE.